Dec. 2, 1930.     S. C. CARTER     1,783,533
POWER TRANSMISSION
Original Filed March 27, 1929
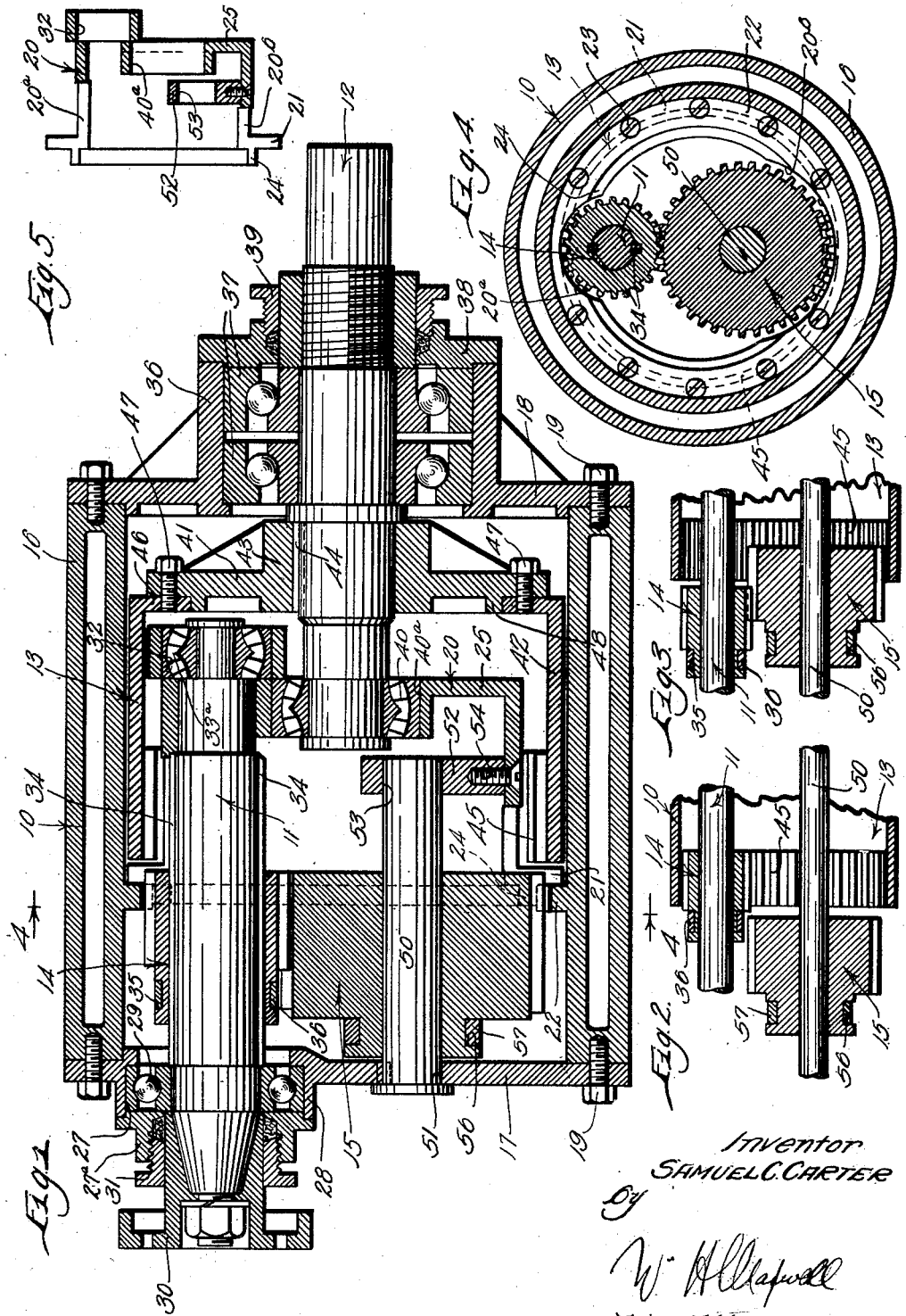
Inventor
SAMUEL C. CARTER
by
his Attorney Patented Dec. 2, 1930

1,783,533

UNITED STATES PATENT OFFICE

SAMUEL C. CARTER, OF LOS ANGELES, CALIFORNIA, ASSIGNOR OF THIRTY-FIVE PER CENT TO ROBERT F. BELCHER, OF LOS ANGELES, CALIFORNIA, TWENTY PER CENT TO WILLIAM H. MAXWELL, OF BEVERLY HILLS, CALIFORNIA, AND TEN PER CENT TO D. M. CALLIS, OF LONG BEACH, CALIFORNIA

POWER TRANSMISSION

Continuation of application Serial No. 350,273, filed March 27, 1929. This application filed January 29, 1930. Serial No. 424,335.

This application is filed in substitution for and as a continuation of my copending application for patent entitled, Reduction and reverse gearing, filed March 27, 1929, Serial No. 350,273.

It is a general object of the invention to provide a simple, compact, and improved speed reduction and reverse gear mechanism.

Another object of the invention is to provide a power transmission of the character mentioned that embodies only three principal parts or gears, namely, a drive gear, a driven gear, and a reversing gear.

Another object of the invention is to provide a power transmission of the character mentioned in which the reversing gear is idle or free of the drive gear when the device is operating in a forward direction.

It is another object of the invention to provide an effective and improved shaft mounting in a power transmitting device of the general character mentioned.

A further object of the invention is to provide a transmission in which the driving gear is shiftable between a position where it is in meshing or driving engagement with the driven gear and a position where it is in engagement with the reversing gear when the reversing gear is in mesh with the driven gear.

Another object of the invention is to provide a mechanism of the character mentioned including an improved and novel form of driven gear which allows for effective, dependable mounting of the other parts of the mechanism.

Other objects and features of my invention will be best and more fully understood from the following detailed description of a typical form and application of the invention, throughout which description reference is had to the accompanying drawings, in which:

Fig. 1 is a longitudinal detail sectional view of the device provided by this invention showing the parts in an idle or inoperative position. Fig. 2 is a reduced fragmentary vertical sectional view illustrating the drive pinion in driving engagement with the driven gear. Fig. 3 is a view similar to Fig. 2 illustrating the reversing gear in engagement with the driven gear and the driving gear meshing with the reversing gear. Fig. 4 is a reduced transverse detail sectional view taken as indicated by line 4—4 on Fig. 1. Fig. 5 is a reduced longitudinal sectional view of the bearing mounting embodied in the invention.

The device provided by the present invention includes, generally, a housing 10, a drive shaft 11 extending into the housing 10, a driven shaft 12 extending into the housing, a driven gear 13 fixed on the shaft 12, a drive gear or pinion 14 on the shaft 11 and adapted to be shifted into and out of meshing engagement with the driven gear 13, and a reversing gear 15 mounted within the housing 10 to be shiftable between a position free of the gears 13 and 14 and a position where it is in meshing engagement with the driven gear 13 and is driven by the drive pinion 14.

The casing or housing 10 is provided to encase the various other parts of the device and may be of any suitable construction. In the particular form of the invention illustrated in the drawings, the housing includes a tubular shell 16 and heads or end plates 17 and 18 closing the ends of the shell 16. The shell 16 is preferably an elongated part and may be provided with spaced walls which form a space adapted to carry a cooling medium, or the like. The end plates 17 and 18 completely close the ends of the shell 16 and may be attached to the shell by bolts 19 or other suitable means.

A supporting cage or bearing mounting 20 is provided within the housing 10 to support the ends of the shafts embodied in the invention. The mounting 20 is substantially tubular in form and is of considerable less diameter than the interior of the housing 10. The mounting is in the nature of a unit adapted to be detachably mounted in the housing. The mounting 20 may be provided at one end with an outwardly projecting radial flange 21 which may be attached to an inwardly projecting flange 22 in the housing. Screws 23 may be employed in securing the mounting flange 21 to the flange 22. An axially extending flange 24 may be provided on the mounting 20 adjacent the flange 21 to engage the inner side of the flange 22 to center the mounting within the housing. One end of the mounting 20, which I will term the inner end, is open, while the other or outer end is provided with an end wall 25. The inner end of the mounting is provided with openings 20$^a$ and 20$^b$ which accommodate the gear 14 and the gear 15, respectively. These openings are of sufficient axial and circumferential extent to allow the gears 14 and 15 to be moved into proper mesh or cooperative engagement with the driven gear 13.

The drive shaft 11 may be considered as driven by or from any suitable source of power. The shaft 11 extends through the end plate 17 and is preferably parallel with the longitudinal axis of the housing. The axis of the shaft 11 is spaced or offset laterally from the central longitudinal axis of the housing 10. In the particular case illustrated the shaft 11 extends through an opening 27 in the plate 17. An outwardly extending tubular projection 28 is provided around the opening. A suitable bearing 29 is mounted in the opening 27 to rotatably support the shaft 11 and is held in place by a retainer 27$^a$ applied to the outer end of the projection 28. A section of a coupling 30 may be mounted on the outer end of the shaft 11. In the preferred construction packing means is provided around the shaft. I have shown a packing gland 31 carried by the retainer 27$^a$. The shaft 11 preferably extends a considerable distance into the housing 10 and its inner end is supported by the mounting 20. The inner end portion of the shaft 11 extends into a bearing 33$^a$ carried in an opening 32 in the end wall 25 of the mounting 20.

The drive pinion 14 is mounted on the shaft 11 between the bearings 29 and 33$^a$ so as to be freely shiftable longitudinally on the shaft and is keyed or splined to the shaft so as to rotate therewith. The pinion 14 may be mounted on the shaft by keys 34. The pinion 14 may be operated along the shaft 11 by any suitable means. In the drawings I have shown an annular groove 35 provided in a projecting end portion of the pinion 14 which is adapted to receive a suitable shifting yoke 36. The shifting yoke 36 may extend to a convenient point at the exterior of the housing in the manner common to mechanisms of this general character.

The driven shaft 12 carries the driven gear 13 and extends into the housing 10 through the end plate 18. The shaft 12 is parallel with the shaft 11 and is located centrally in the housing. An outwardly projecting boss 36 may be provided on the end plate 18 and has a central opening carrying bearings 37. The bearings 37 rotatably support the shaft 12 and may be retained in the boss 36 by a retainer 38 applied to the outer end of the boss. The retainer 38 has a central opening passing the shaft 12 and a packing gland 39 may be provided in the opening to pack around the shaft. The shaft 12 extends into the housing and has its inner end portion supported in an opening 40$^a$ in the end wall 25 of the mounting 20 through a suitable bearing 40.

The driven gear 13 is mounted on the shaft 12 and is positioned and formed so as to be engaged by either the drive pinion 14 or the reversing gear 15. In the particular case illustrated the driven gear 13 consists of a central disk 41 mounted on the shaft 12 beyond the outer end of the mounting 20 and an axially extending tubular part 42 at the periphery of the disk 41 extending over the outer end portion of the mounting. The disk 41 is arranged adjacent the inner side of the end plate 18 and is provided with a hub 43 which is fixed to the shaft 12 by a suitable key 44, or the like. The tubular portion 42 surrounds the outer portion of the mounting member 20 and is provided on its interior side or wall at the end removed from the disk 41 with a series of teeth 45 forming an internal gear. The portion 42 is preferably comparatively long and is positioned so that the teeth 45 are adapted to be engaged by the teeth of the pinion and the reversing gear 15. The portion 42 may be formed separate from the disk in which case it may be provided with an inwardly extending radial flange 46 to be secured to the disk 41 by bolts 47, or the like. A centering flange 48 may be provided on the disk to abut the inner edge of the flange 46 to center the tubular portion 42 within the housing.

The reversing gear 15 is rotatably and shiftably mounted within the housing so that it is operable from a position free of the driven gear 13 and the drive pinion 14 when the drive pinion is in mesh with the driven gear, and a position where it is in meshing engagement with the driven gear 13 and is adapted to be engaged or driven by the drive pinion 14. In accordance with the invention the reversing gear 15 is mounted within the housing 10 so that it is normally outward of or beyond the part 42 of the driven gear and is operable to be shifted into engagement with the teeth 45 of the driven gear. In the preferred form of the invention the reversing gear 15 is rotatably and shiftably mounted on a fixed shaft 50. The shaft 50 is fixed, for instance, keyed, in an opening 51 in the end plate 17 and extends into the housing 10 parallel with the shaft 11. The inner end portion of the shaft 50 is supported by a block 52 carried by and forming a part of the mounting 20. The block 52 may have an opening 53 carrying the end of the shaft 50 and may be fixed in the mounting 20 by suitable screws 54. The shaft 50 is sufficiently long to permit the gear 15 to be shifted into and out of engagement with the driven gear 13. In the particular case illustrated the reversing gear 15 is larger in diameter than the drive pinion 14 and is comparatively long so that it is adapted to mesh with the driven gear 13 at the same time it is engaged by the pinion 14. The outer end of the reversing gear 15 may be provided with a reduced portion having an annular groove 56. The groove 56 is adapted to receive a shifting yoke 57 for shifting the gear 15 along the shaft 50. The shifting yoke 57 may extend to the exterior of the housing. With the construction just described the reversing gear 15 is operable between a free position where it is free of the driven gear 13, such as is illustrated in Fig. 2 of the drawings, and a position where it is in engagement with the teeth 45 of the driven gear 13, in which position it is adapted to be driven by the drive pinion 14 as illustrated in Fig. 3 of the drawings.

It is believed that the operation of the device provided by this invention will be readily apparent from the foregoing detailed description. In operating the driven shaft 12 in what I will term a forward direction the drive pinion 14 is in direct meshing engagement with the internal driven gear 13, as illustrated in Fig. 2 of the drawings. With this positioning of the parts the reversing gear 15 is free of both the driven gear and the drive pinion. It will be obvious that a substantial reduction of speed may be obtained through this construction. To reverse the direction of rotation of the shaft 12 or to operate the shaft 12 in a reverse direction, the drive pinion 14 is shifted to a position where it is free of the driven gear 13, but meshes with the reversing gear. The reversing gear 15 is then shifted along the shaft 50 so that it is brought into meshing engagement with the teeth of the driven gear 13. It is obvious, of course that the pinion 14 and the reversing gear 15 may be proportioned in various manners to obtain various speed reductions through the mechanism. It is to be particularly noted that the mounting member 20 operates to effectively support the inner ends of the shafts 11 and 12 and 50.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A power transmission including, a drive shaft having a fixed axis, a driven shaft having a fixed axis, an internal driven gear on the driven shaft, a drive gear slidably mounted on the drive shaft adapted to be shifted into engagement with the driven gear, and a shiftably mounted reversing gear adapted to be shifted into engagement with the driven gear, the drive gear being operable to a position where it is free of the driven gear and engages the reversing gear when the reversing gear is in engagement with the driven gear, the drive shaft terminating within the driven gear.

2. A transmission including, a drive shaft having a fixed axis, a driven shaft having a fixed axis, an internal gear fixed on the driven shaft, a reversing gear shiftable into and out of engagement with the driven gear, a drive gear rotatable with and slidable on the drive shaft and operable between a position in engagement with the driven gear and a position where it engages the reversing gear when the reversing gear is in engagement with the driven gear, the drive shaft terminating within the internal gear, and means supporting the drive shaft within the internal gear.

3. A power transmission including, a housing, a drive shaft extending into the housing, a driven shaft extending into the housing, an internal driven gear fixed on the driven shaft within the housing, a support for the inner end of the drive shaft within the driven gear, a reversing gear in the housing shiftable into and out of engagement with the driven gear, a drive gear slidable axially on and rotatable with the drive shaft within the housing and shiftable between a position where it engages the driven gear and a position where it engages the reversing gear when the reversing gear is in engagement with the driven gear.

4. A power transmission including, a housing, a drive shaft extending into the housing, a driven shaft extending into the housing, an internal driven gear fixed on the driven shaft within the housing, a reversing gear in the housing shiftable into and out of engagement with the driven gear, a drive gear slidable axially on and rotatable with the drive shaft within the housing and shiftable between a position where it engages the driven gear and a position where it engages the reversing gear when the reversing gear is in engagement with the driven gear, and means within the driven gear supporting the inner ends of said shafts.

5. A power transmission including, a housing, a drive shaft extending into the housing, a driven shaft extending into the housing, a driven gear fixed on the driven shaft within the housing, a reversing gear in the housing shiftable into and out of engagement with the driven gear, a drive gear slidable axially on and rotatable with the drive shaft within the housing and shiftable between a position where it engages the driven gear and a position where it engages the reversing gear when the reversing gear is in engagement with the driven gear, and means within the housing for supporting the inner ends of said shafts, said means including a unitary mounting member within the housing.

6. A power transmission including, a housing, a drive shaft extending into the housing, a driven shaft extending into the housing, an internal driven gear fixed on the driven shaft, a stationary shaft in the housing, a reversing gear slidable and rotatable on the stationary shaft and shiftable into and out of engagement with the driven gear, a drive gear rotatable with the drive shaft and slidable thereon between a position where it engages the driven gear and a position where it engages the reversing gear, and a mounting member within the housing supporting one end of each of the said shafts.

7. A power transmission including, a housing, a drive shaft extending into the housing, a driven shaft extending into the housing, an internal driven gear fixed on the driven shaft, a stationary shaft in the housing, a reversing gear slidable and rotatable on the stationary shaft and shiftable into and out of engagement with the driven gear, a drive gear rotatable with the drive shaft and slidable thereon between a position where it engages the driven gear and a position where it engages the reversing gear, and means rotatably supporting the driven shaft and the drive shaft, said means including a mounting member fixed in the housing supporting one end of each of the said shafts and bearings carried by the housing and carrying the shafts where they enter the housing.

8. A power transmission including, a housing, a drive shaft extending into the housing and terminating in the housing and having a fixed axis in the housing, a driven shaft extending into the housing and terminating in the housing and having a fixed axis in the housing, a driven gear rotatable with the driven shaft within the housing, a reversing gear in the housing shiftable into and out of engagement with the driven gear, a drive gear slidable axially on and rotatable with the drive shaft within the housing and shiftable into and out of a position where it engages the driven gear and being in constant engagement with the reversing gear, and means supporting the terminal ends of the shafts within the housing.

9. A power transmission including, a housing, a drive shaft extending into the housing and supported by the housing on a fixed axis, said shaft terminating within the housing, a driven shaft extending into the housing from the opposite direction and supported by the housing on a fixed axis, means within the housing supporting the inner ends of the shafts, an internal driven gear fixed on the driven shaft within the housing, a shaft in the housing having one end supported by the housing, means within the housing supporting the other end of the last-mentioned shaft, a reversing gear on the last-mentioned shaft shiftable into and out of engagement with the driven gear, and a drive gear slidable axially on and rotatable with the drive shaft within the housing and shiftable between a position where it engages the driven gear and a position where it engages the reversing gear when the reversing gear is in engagement with the driven gear.

10. A reduction reverse gearing comprising a casing, a bearing mounting secured to the inside of said casing, bearings in said bearing mounting, a block in said bearing mounting, a drive shaft extending into said casing and said bearing mounting and journaled in one of said bearings, a driven shaft extending into said casing and journaled in the other bearing in said bearing mounting, an internal driven gear in said casing secured on said driven shaft and into which said bearing mounting and said drive shaft extends, a drive gear splined on said drive shaft to be shifted into and out of mesh with said internal driven gear, a reversing gear shaft secured at one end to said casing and at its other end to said block, and a reversing gear rotatably and slidably mounted on said reverse gear shaft to be shifted into and out of mesh with said internal drive gear and into mesh with said drive gear when the latter gear is out of mesh with said internal gear.

11. A power transmission of the character described including, three relatively shiftable gears, a drive gear, an internal driven gear, and a reversing gear, a shaft supporting the drive gear on a fixed axis and terminating within the driven gear, means supporting the terminal end of said shaft and means mounting the driven gear on a fixed axis, the drive and driven gears being related for relative shifting into and out of cooperative engagement, the reversing gear and the driven gear being related for relative shifting into and out of cooperative engagement and the drive gear and reversing gear being related for relative shifting so that they can be arranged in cooperative engagement when the drive gear is out of engagement with the driven gear and the reversing gear is in cooperative engagement with the driven gear.

12. A transmission including, a drive shaft having a fixed axis, a driven shaft having a fixed axis, an internal gear fixed on the driven shaft, a reversing gear shiftable into and out of engagement with the driven gear, a drive gear rotatable with and slidable on the drive shaft and operable between a position in engagement with the driven gear and a position where it engages the reversing gear when the reversing gear is in engagement with the driven gear, the drive shaft terminating within the internal gear, and a shaft mounting having a part within the internal gear, the shaft mounting supporting the drive shaft and also the driven shaft.

13. A transmission including, a drive shaft having a fixed axis, a driven shaft having a fixed axis, an internal gear fixed on the driven shaft, a counter shaft, a reversing gear on the counter shaft shiftable into and out of engagement with the driven gear, a drive gear rotatable with and slidable on the drive shaft and operable between a position in engagement with the driven gear and a position where it engages the reversing gear when the reversing gear is in engagement with the driven gear, the drive shaft terminating within the internal gear, and a shaft mounting having a part within the internal gear, the shaft mounting supporting the drive shaft, the driven shaft and the counter shaft.

14. A power transmission including, a housing, a drive shaft extending into the housing, a driven shaft extending into the housing, an internal driven gear fixed on the driven shaft within the housing, a shaft carrier within the housing supporting the driven shaft and supporting the drive shaft within the internal gear, a reversing gear in the housing shiftable into and out of engagement with the driven gear, a drive gear slidable axially on and rotatable with the drive shaft within the housing and shiftable between a position where it engages the driven gear and a position where it engages the reversing gear when the reversing gear is in engagement with the driven gear.

In witness that I claim the foregoing I have hereunto subscribed my name this 24th day of January, 1930.

SAMUEL CLARK CARTER.